United States Patent [19]
Lim

[11] Patent Number: 6,016,341
[45] Date of Patent: Jan. 18, 2000

[54] TELEPHONE WITH DATA ACQUISITION MEANS

[75] Inventor: Boon-Chen Lim, Taikoosing, The Hong Kong Special Administrative Region of the People's Republic of China

[73] Assignee: Cybiotronics, Ltd., The Hong Kong Special Administrative Region of the People's Republic of China

[21] Appl. No.: 09/136,205

[22] Filed: Aug. 19, 1998

Related U.S. Application Data

[63] Continuation of application No. 08/622,460, Mar. 22, 1996, abandoned, which is a continuation-in-part of application No. 08/622,043, Mar. 21, 1996, abandoned.

[30] Foreign Application Priority Data

Mar. 22, 1995 [GB] United Kingdom .................... 9505770

[51] Int. Cl.[7] ................................................ H04M 15/06
[52] U.S. Cl. ........................................ 379/142; 379/201
[58] Field of Search .................................. 379/142, 354, 379/67.1, 243, 246, 245, 247, 257, 196, 251, 202, 203, 204, 156, 157; 455/415

[56] References Cited

U.S. PATENT DOCUMENTS

| | | | |
|---|---|---|---|
| 4,605,825 | 8/1986 | Komuro et al. | 379/156 |
| 4,905,274 | 2/1990 | Cooper et al. | 379/156 |
| 5,119,413 | 6/1992 | Okumura et al. | 379/156 |
| 5,265,145 | 11/1993 | Lim | 379/142 |
| 5,309,509 | 5/1994 | Cocklin et al. | 379/156 |
| 5,568,546 | 10/1996 | Marutiak | 379/355 |
| 5,592,546 | 1/1997 | Takahashi | 379/142 |
| 5,644,629 | 7/1997 | Chow | 379/142 |

*Primary Examiner*—Curtis A. Kuntz
*Assistant Examiner*—Rexford N Barnie
*Attorney, Agent, or Firm*—Townsend And Townsend and Crew LLP

[57] ABSTRACT

A telephone, or a telephone add-on device, is disclosed comprising data receiving means, and control means responsive to data received by the data receiving means. The control means is adapted to recognize any instruction code embedded in the data which is then processed in accordance with the nature of the code, the processing including storing in a memory. This allows a telephone to be downloaded with information, such as, for example, special service codes, identification or priority callers, and the information downloaded can be tailor-made for an individual rather than being standardized and pre-stored.

28 Claims, 6 Drawing Sheets

TELEPHONE WITH DATA ACQUISITION MEANS

The present application is a continuation of and claims the benefit of U.S. application Ser. No. 08/622,460, filed Mar. 22, 1996, which is a continuation-in-part of U.S. application Ser. No. 08/622,043, filed Mar. 21, 1996, ABN and United Kingdom Application Ser. No. 9505770.9, filed Mar. 22, 1995, the disclosures of which are incorporated by reference.

BACKGROUND OF THE INVENTION

The present invention relates generally to a telephone apparatus having a display and push-buttons for actuating various telephone features. More specifically, the present invention relates to a telephone apparatus which automatically acquires, converts, analyzes, stores, and retrieves information or data transmitted over telephone lines, and which also performs automatic data processing and data transmission of the data or information. The apparatus may be integrated with a telephone or may be utilized as an add-on device for a conventional telephone.

Telephone companies provide many extra and useful subscriber features in addition to providing conventional voice communication between users. One such feature is the "Caller Identification" service which sends the number and/or name of a calling party together with the incoming call. Information processing circuitry in the telephone set, usually comprising a micro-processor unit (MPU) and a memory, is employed to show the caller's number and/or phone number on a suitable display. Some telephone terminals are further provided with circuitry for comparing the number of a calling party with stored information, and for classifying the call as either "wanted" or "rejected." When the call is classified as "wanted," a special ringing tone is provided to alert the user of the call. When the call is classified as "rejected," the number is displayed. An alert indicator may also be used to indicate the presence of a "rejected" incoming call.

Another type of subscriber feature involves the use of "Special Service Codes"(SSC) for performing a variety of special service functions offered by a particular telephone company. The range of special service functions typically offered by telephone companies includes, but is not limited to, "Call-Forward," "Camp-On Busy," "Call Trace," and "Conference." Usually, the user initiates a special service function by pressing one or more keys at the subscriber terminal which causes the microprocessor to send the SSC to the telephone switching network from the subscriber terminal.

State-of-the-art telephone terminals or add-on devices are available to fully take advantage of such subscriber features. An example of such a device is disclosed in co-pending U.S. patent application Ser. No. 08/162,910, incorporated here by reference. This device greatly simplifies the pre-storing, retrieving and dialing of large numbers of special service codes.

However, in many countries, the number of SSC's defined by the various telephone companies is too great to be conveniently pre-stored in such a device. The different providers of local telephone service often have their own set of SSC's. Therefore, pre-storing all the possible SSC's for a given country or region into a single unit requires a device having a large memory capacity. Furthermore, when so many codes are stored in the device, it is not generally convenient for the user to later access a desired SSC for his/her use. It would be very convenient, therefore, to have only the SSC's which are suitable for the particular telephone service provider to which the subscriber terminal is attached, transmitted and down-loaded to the subscriber terminal via ordinary telephone lines (as a service provided by a phone company), or to any other service center by specific transmitter devices.

SUMMARY OF THE INVENTION

The present invention provides a method and apparatus for enabling a user's telephone terminal to automatically acquire, process, and store telephone service information retrievable from conventional telephone lines or another specified input port.

According to a first aspect of the present invention, it comprises telephone device for automatically acquiring, processing, and storing telephone service data retrievable from convention telephone lines or another specified input port. The telephone device may be provided as an add-on device for a conventional telephone or may be integrated with a conventional telephone.

One embodiment of the telephone device comprises an incoming-call interface, and outgoing-call interface, a classifier unit, a controller, a data storage unit, a display unit, a user interface, and a sound transducer. The incoming-call interface receives and decodes input data signals included in an incoming-call signal from a telephone line. The outgoing-call interface generates an outgoing-call signal in response to a plurality of output data signals from the controller. The classifier unit recognizes when the input data signals include an instruction code and information signals. The controller processes the information signals according to the instruction code.

The data storage device, in one embodiment, is divided into a plurality of pre-defined memory areas, each for storing information signals of a particular type. The plural memory areas include, without limitation, a name-and-number directory memory area, a "priority-call" memory area, a "reject-call" memory area, a special service code memory area, and a mailbox memory area.

According to a second aspect of the present invention, it comprises a data transmitter for generating data having an instruction code embedded therein, and for transmitting the data over conventional telephone lines or for inputting the data directly into a specified input port of the above-described telephone device.

According to a third aspect of the present invention, it comprises an integrated transmitter and receiver for generating and transmitting data having an instruction code embedded therein, and for automatically acquiring, processing, and storing telephone service data retrievable from convention telephone lines or another specified input port.

According to a fourth aspect of the present invention, it comprises a method for enabling a user's telephone terminal to automatically acquire, process, and store telephone service information retrievable from conventional telephone lines or another specified input port. According to one embodiment of the method, it includes the steps of receiving input data signals from a telephone line or directly via an input port, determining whether the input data signals includes an instruction code and information signals, determining the type of instruction code included in the input data signals, and storing the information signals in a pre-defined memory area of a data storage unit according to the type of instruction code.

The information signals described in the foregoing paragraphs includes, without limitation, special service codes for activating a special service provided by a phone service provider, telephone numbers, and alphanumeric characters representing the names of callers or other individuals. The present invention also includes apparatus and methods for retrieving the stored information signals, displaying it, selecting it, and causing the telephone device to dial the selected number or SSC.

These and other aspect and embodiment of the present invention will become apparent to one of ordinary skill in the art by reference to the remaining portions of the specification and to the drawings.

DESCRIPTION OF THE SPECIFIC EMBODIMENTS

TABLE OF CONTENTS
I. CONFIGURATION
   A. Telephone Device
   B. Data-Transmitter
   C. Integrated Transmitter and Receiver
   D. Telephone Data Network
II. DETAILED OPERATION
   A. Caller-Identity Database Installation
   B. Caller Identification
   C. Network Special Services Codes
   D. One-Touch Dialing of Special Service Codes
   E. Mailbox Facilities
   F. Stored Data Maintenance
   G. MPU Data Handling Process
I. CONFIGURATION
   A. Telephone Device Referring to FIG. 1, there is shown a block diagram of a telephone device 100 embodying the present invention and comprising an interface circuit 142, a controller 107, a data storage unit 109, a display unit 108, an audible transducer 140, and a user interface 110.

Figure 1:
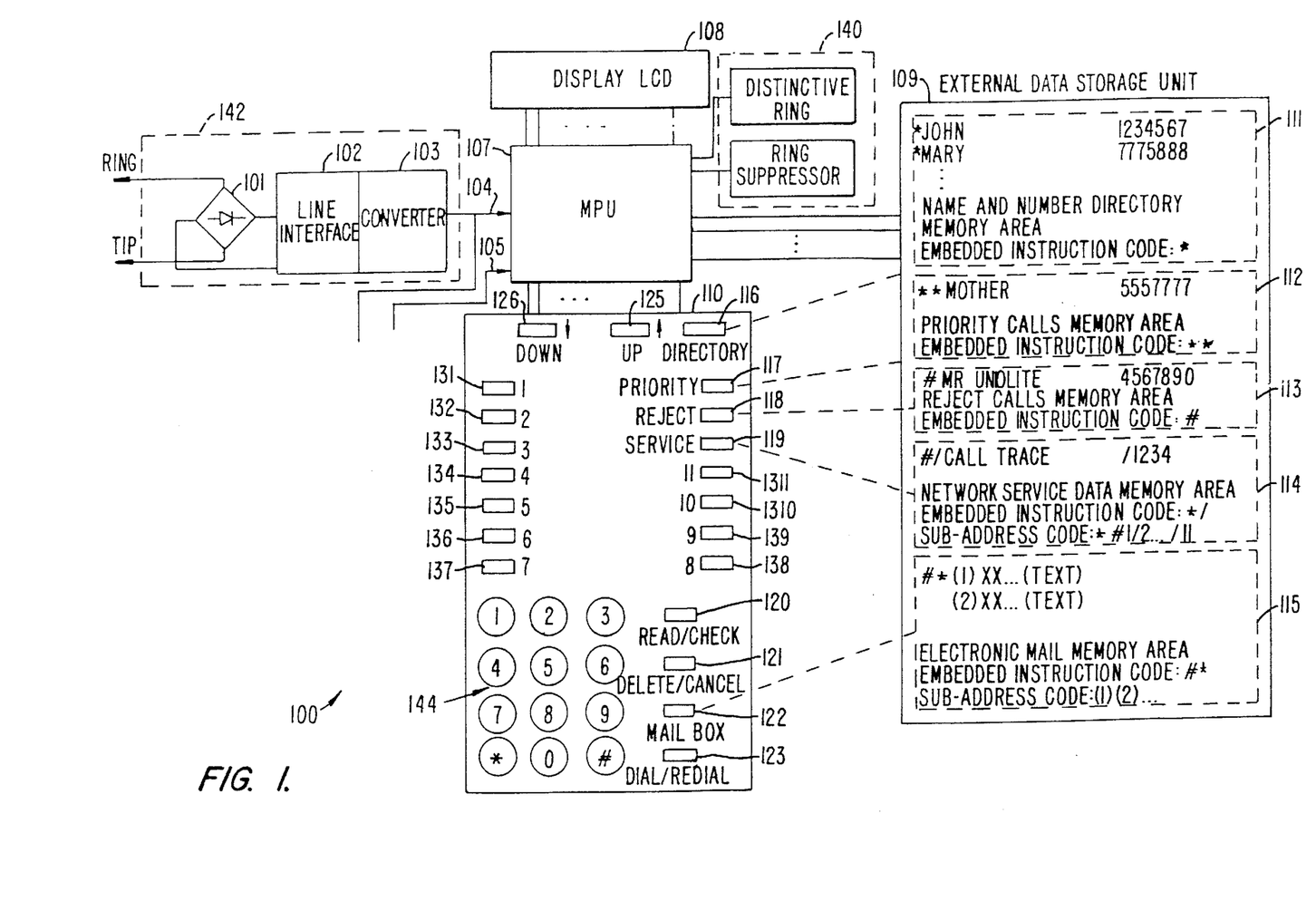
FIG. 1 is a block diagram of a telephone device according to the present invention.

Interface circuit 142 converts a modulated signal at its input into a demodulated pulse signal at its output and comprises a polarity guard 101, a line interface unit 102, and convertor circuit 103. In the preferred embodiment, the input of interface circuit 142 is coupled to the "Tip and Ring" (T and R) lines of a public switching telephone network (PSTN) (not shown), and the output is coupled to controller 107. When there is an incoming call, modulated signals present at the input of interface circuit 142 are demodulated by interface circuit 142 and converted into serial bit stream of data-carrying pulses recognizable by controller 107. The input data is typically in the form of Frequency-Shift Keying (FSK) and Dual-Tone Multi-frequency (DTMF) modulated signals; however, other modulation types may also be suitably employed. Such data conversions are easily handled by standard line interface circuits, which are readily available from many conventional integrated circuit manufacturers and therefore require no detailed explanation.

Controller 107 is a simple commercially available microprocessor unit (MPU) connected to other parts of the circuitry. MPU 107 includes a caller port 104 for receiving converted data from the telephone lines via interface circuit 142, and an input port 105 for receiving unconverted data directly from a suitable input device. MPU 107 is customizable to provide the following functions, without limitation: to provide conventional telephone features, to classify and process received data according to an instruction code appended thereto, to store received data into pre-defined memory areas of data-storage unit 109 and to retrieve the same, to compare received data with stored information and instructions to determine appropriate actions for MPU 107, to send information to a display unit 108 for display to the user, and to send service codes to the telephone switching network.

Data-storage unit 109 is coupled to MPU 107 and preferably comprises random access memory (RAM), which may be either integrated with MPU 107 or provided as a discrete integrated circuit. In a preferred embodiment, data-storage unit 109 is further divided into a plurality of pre-defined memory areas including, without limitation, a Name and Number Directory Memory Area (NNDMA) 111, a Priority Calls Memory Area (PCMA) 112, a Reject Calls Memory Area (RCMA) 113, a Network Special Service Code Memory Area (NSSCMA) 114, and a Mailbox Memory Area (MBMA) 115. Each pre-defined memory area of data-storage unit 109 stores data of a specific type according to an instruction code appended to the received data.

As an alternative to dividing the data-storage unit into pre-defined memory areas, data is stored in data-storage unit 109 according to the type of instruction code appended thereto. Dividing the data-storage unit into pre-defined memory areas is simpler to implement, but grouping the data according to the type of embedded instruction code is a better approach for optimizing the use of storage space in data-storage unit 109.

In the preferred embodiment, display unit 108 is a liquid crystal display (LCD). However, other types of display devices commonly used in electronic devices may also be suitably employed.

Audible transducer 140 is coupled to MPU 107 via a ring control circuit (not shown) of the type commonly available from various telecommunications integrated circuit manufacturers. The ring control circuit generates different audible signals according to instructions received from MPU 107 to alert the user of an incoming call, for example.

User interface 110 is also coupled to MPU 107 and includes a plurality of keys with which the user controls telephone device 100. In the preferred embodiment, the plurality of keys includes the following, without limitation: a numeric keypad 144; an UP key 125; a DOWN key 126; a common directory key 116; a common priority key 117; a common reject key 118; a common service key 119; a common delete/cancel key 121; a mailbox key 122; a common dial key 123; and a plurality of one-touch dial keys 131–131₁₁. The foregoing list is for exemplary purposes only and is not intended to limit the number or type of keys which may suitably be employed in user interface 110.

Numeric keypad 144 comprises numbered keys, 0–9, and special keys, "#" and "*", by which the user enters data, including phone numbers, into telephone device 100. UP key 125 and DOWN key 126, when pressed, cause information displayed on display unit 108 to scroll up or down, respectively. Common directory key 116, when pressed, causes MPU 107 to retrieve information stored in NNDMA 110 and to display the same on display unit 108. Common priority key 117, when pressed, causes MPU 107 to retrieve information stored in PCMA 112 and to display the same on display unit 108. Common reject key 118, when pressed, causes MPU 107 to retrieve information stored in RCMA 113 and to display the same on display unit 108. Common service key 119, when pressed, causes MPU 107 to retrieve information from NSSCMA 114 and to display the same on display unit 108. Common delete/cancel key 121, when pressed, causes MPU 107 to delete the data specified by the user from data-storage unit 108, or to cancel the special service activated by the user, accordingly. In the preferred embodiment, the data to be deleted from data-storage unit 108, or the special service to be cancelled corresponds to the information shown on display unit 108 when the common delete/cancel key 121 is pressed. Mailbox key 122, when pressed, causes MPU 107 to retrieve the data stored in MBMA 115 and to display the same on display unit 108. Common dial key 123, when pressed, causes the phone number or SSC specified by the user to be output to the telephone switching network (not shown). In the preferred embodiment, the specified phone number or SSC corresponds to the number or SSC displayed on display unit 108 when the common dial key 123 is pressed.

B. Data-Transmitter

Figure 2:
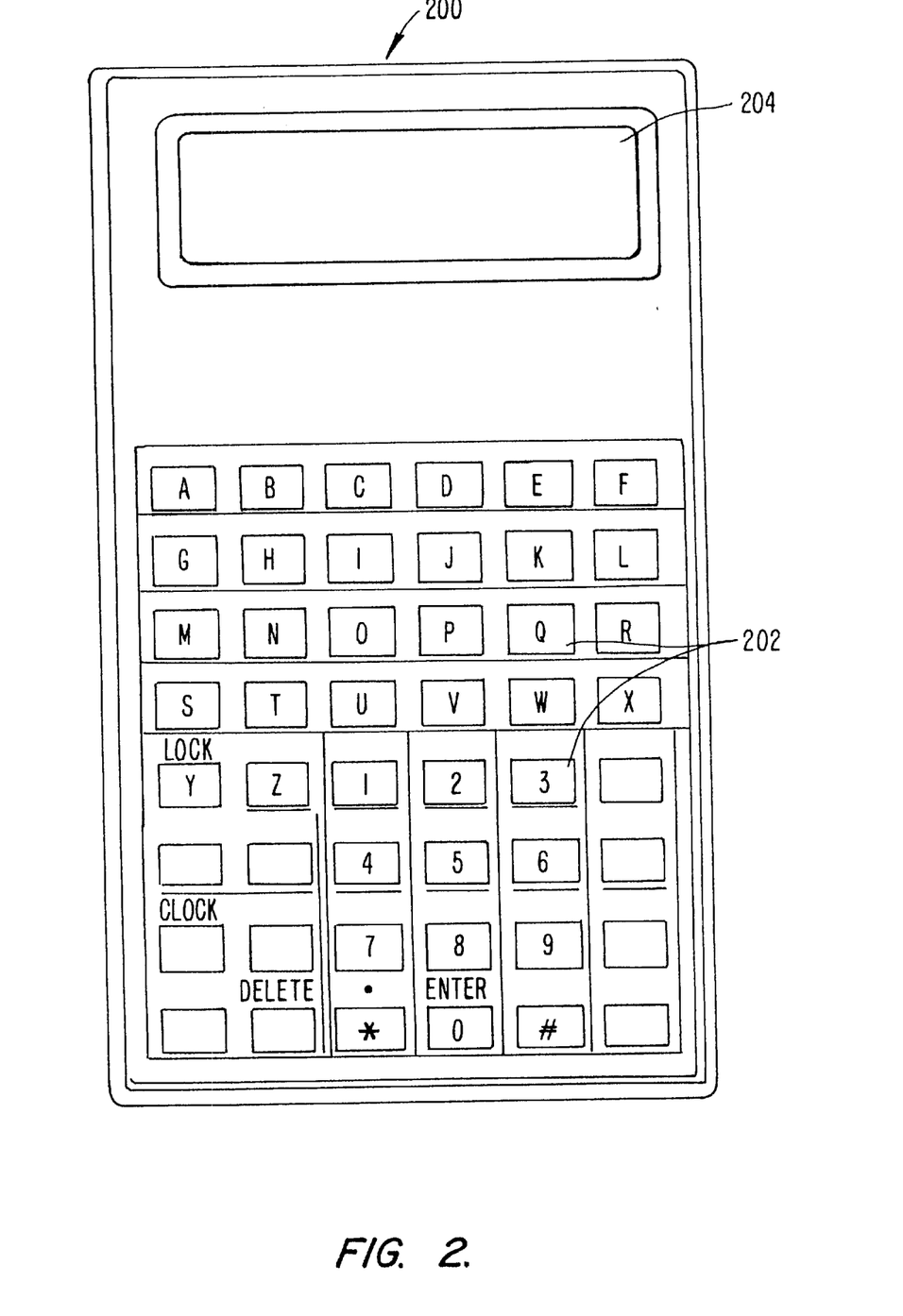
FIG. 2 is an illustration of data transmitter according to the present invention.

Referring now to FIG. 2, there is shown a data-transmitter 200 comprising an alpha-numeric keypad 202, a display unit 204, and transmitter circuitry (not shown). The transmitter circuitry comprises an MPU (not shown) and a conventional modulating integrated circuit (not shown), such as an XR2206, for example. Alpha-numeric keypad 202 comprises a plurality of keys by which the user controls the operation of data-transmitter 200. The MPU included in the transmitter circuitry converts the entries of alpha-numeric keypad 202 into a serial bit stream of data-carrying pulses, which is converted by the modulating integrated circuit into an FSK modulated signal, for example. The modulated signals are then coupled onto a telephone trunk line (not shown). Data-transmitter 200 also generates data in a format directly recognizable by MPU 107 in telephone device 100. Hence, data with embedded instruction codes may be input directly into MPU 107 by transmitter 200 via input port 105. Display unit 204, an LCD in the preferred embodiment, allows data monitoring by the user of transmitter 200.

C. Integrated Transmitter and Receiver

Figure 3:
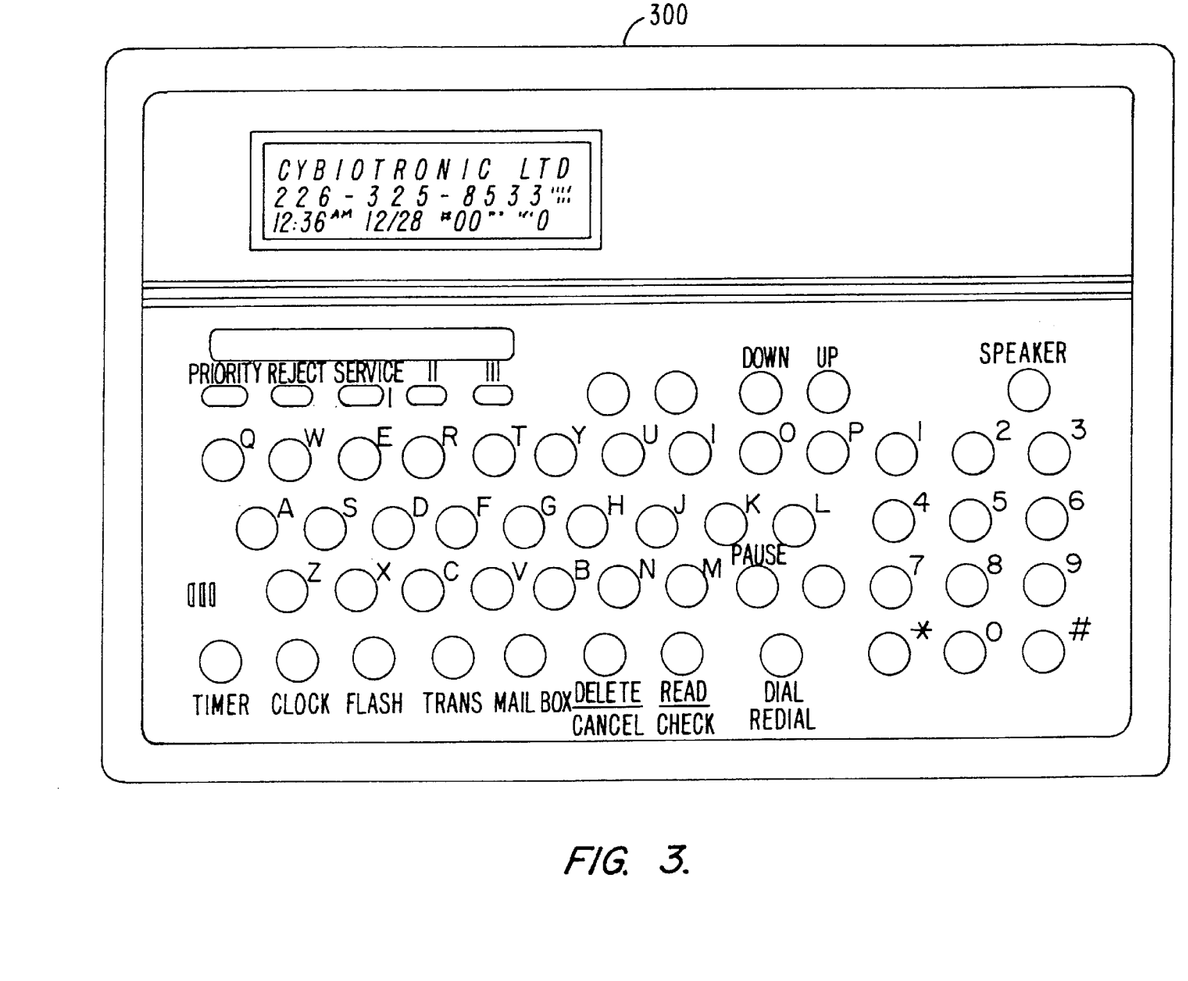
FIG. 3 is an illustration of an integrated transmitter and receiver according to the present invention.

An integrated transmitter and receiver 300 is shown in FIG. 3. It comprises the functions, features, devices and circuitry of the devices shown in FIGS. 1 and 2 in a single integrated device.

D. Telephone Data Network

Figure 4:
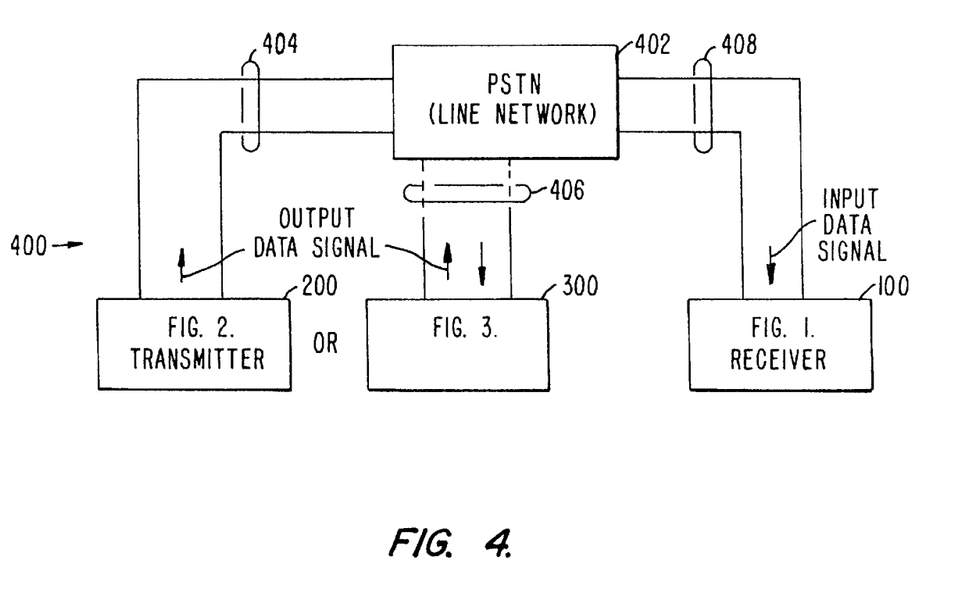
FIG. 4 is a telephone data network according to the present invention.

Referring to FIG. 4, there is shown a telephone data network 400 comprising PSTN 402, data-transmitter 200, integrated receiver and transmitter 300, and telephone device 100 of the present invention. PSTN directs telephone data from one telephone trunk line to another according to switching signals including in said data. Data-transmitter 200 produces modulated data signals, including an embedded instruction code, which are coupled to PSTN 402 via telephone trunk line 404. PSTN 402 directs the modulated data signals to integrated transmitter and receiver 200 according to a first set of switching signals. Integrated transmitter and receiver 200 then receives the modulated data signal via telephone trunk line 406. Alternatively, PSTN directs the modulated data signals from data-transmitter 200 to telephone device 100 according to a second set of switching data. In that case, telephone device 100 receives the modulated data signals via telephone trunk line 406. Similarly, integrated transmitter and receiver 300 produces modulated data signals which are coupled to PSTN 402 via telephone trunk line 406. PSTN then directs the modulated data signals to telephone device 100, and telephone device 100 receives the modulated data signals via telephone trunk line 408.

II. DETAILED OPERATION

The following are some further examples of applications of the present invention. The role of the embedded instruction code will be seen more clearly.

A. Caller-Identity Database Installation i) Name and Number Construction

To build a personalized name and number directory, the subscriber provides the telephone company or other phone service provider with a list of the names and corresponding phone numbers he/she wants in the directory. The phone service provider then installs the directory in the subscriber's telephone device 100 or integrated transmitter and receiver 300 via the telephone lines. In the present invention, the phone service provider implements the installation by embedding a Name and Number Conversion Instruction Code (NNCIC) with the name-and-number data transmitted to the subscriber. In the preferred embodiment, the NNCIC corresponds to the telephone keypad symbol "*" which is appended to the name and phone number supplied to the subscriber, although other symbols also could be suitably employed. The phone service provider modulates the name-and-number data and the embedded NNCIC's and transmits the modulated signal to the subscriber terminal (i.e., telephone device 100 or integrated transmitter and receiver 300) via the telephone lines. The subscriber terminal receives the modulated name-and-number data and embedded NNCIC's, and interface circuit 142 converts the modulated signals into a form recognizable by MPU 107. MPU 107 identifies the NNCIC and executes a set of instructions to store the name-and-number data in NNDMA 111 as shown in FIG. 1. Alternatively, a user of data-transmitter 200 provides name-and-number data and embedded NNCIC's to data-transmitter 200 via alpha-numeric keypad 202. The name-and-number data and embedded NNCIC's are then input directly to MPU 107 of the subscriber terminal via input port 105.

When the subscriber presses common directory key 116, MPU 107 executes a set of instructions to display the contents of NNDMA 111 on display unit 108. The subscriber may search the contents of NNDMA 111 to locate a desired name and number by pressing UP key 125 and DOWN key 126. When the subscriber presses the common dial key 123, MPU 107 executes another set of instructions to send the desired phone number to the telephone switching network. In the preferred embodiment of the present invention, the specified phone number corresponds to the name and/or phone number shown on display unit 108 when the subscriber presses common dial key 123.

ii) "Priority-Call" and "Reject-Call" Directory Construction

Similarly, to build personalized "Priority-Call" directory and "Reject-Call" directories, the subscriber provides the phone service provider with a list of the names and corresponding phone numbers he/she wants in the "Priority-Call" directory and the "Reject-Call" directory, respectively. The phone service provider embeds a Priority Call Instruction Code (PCIC) to the priority-name-and-number data transmitted to the subscriber, and a Reject Call Instruction Code (RCIC) to the reject-name-and-number data transmitted to the subscriber. In the preferred embodiment, the PCIC and RCIC correspond to the telephone keypad symbols "**" and "##", respectively. The phone service provider modulates the data and transmits it to the subscriber terminal via the telephone lines. The subscriber terminal receives the data and converts them into a form recognizable by MPU 107. MPU 107 identifies the PCIC's or RCIC's and executes a set of instructions to store the name and number data in PCMA 112 or RCMA 113, accordingly, as shown in FIG. 1. Alternatively, a user of data-transmitter 200 provides name-and-number data and embedded PCIC's or RCIC's, accordingly, to data-transmitter 200 via alpha-numeric keypad 202. The name-and-number data and embedded PCIC's or RCIC's are then input directly to MPU 107 of the subscriber terminal via input port 105.

When the subscriber presses common priority key 117, MPU 107 executes a set of instructions to display the contents of PCMA 112 on display unit 108. The subscriber may search the contents of PCMA 112 to locate a desired name and number by pressing UP key 125 and DOWN key 126. When the subscriber presses the common dial key 123, MPU 107 executes another set of instructions to send a specified phone number to the telephone switching network. In the preferred embodiment of the present invention, the specified phone number corresponds to the name and/or phone number shown on display unit 108 when the subscriber presses common dial key 123.

Similarly when the subscriber presses common reject key 118, MPU 107 executes a set of instructions to display the contents of RCMA 113 on display unit 108. The subscriber searches the contents of RCMA 113 and dials a specific number in RCMA 113 in the manner described above with respect to PCMA 112.

B. Caller Identification

When MPU 107 detects an incoming call at "caller port" 104, and the incoming data does not include an embedded instruction code, MPU 107 classifies the incoming call data as conventional "caller identification" data. When the caller identification data includes data corresponding to the name of the caller and the phone number of the caller, the caller's name and number are displayed on display unit 108. When the caller-identification data includes data corresponding to a phone number of the caller, but does not include a name of the caller, MPU 107 compares the caller's phone number to the list of numbers stored in NNDMA 111. When there is a match, MPU executes a set of instructions to retrieve the corresponding name and number from NNDMA 111 and to display the same on display unit 108.

The caller's number is next compared to the list of numbers stored in PCMA 112 and RCMA 113. When the caller's number matches one stored in PCMA 112, MPU 107 executes a set of instructions to cause audible transducer 140 to generates a special ring tone for indicating that the incoming call is a priority call. Conversely, in the preferred embodiment, when the caller's number matches one stored in RCMA 113, MPU 107 executes a set of instructions to cause audible transducer 140 to be silent.

C. Network Special Services Codes

A personalized SSC directory is created in a manner similar to that described above with respect to the name and number directory, the priority-call directory, and the reject-call directory. Specifically, the subscriber indicates to the phone service provider the special services desired. In response, the phone service supplies SSC data to caller port 104 of MPU 107 via the telephone lines. In the preferred embodiment, SSC data includes the SSC's corresponding to the desired special services, the instructions for each of the desired special services, and embedded Special Service Instruction Codes (SSIC's). In the preferred embodiment, the SSIC corresponds to the telephone keypad symbol "#" although other symbols may be suitably employed. The subscriber terminal receives the SSC data, converts it, and stores it in NSSCMA 114 as shown in FIG. 1. Alternatively, a user of transmitter 200 may supply each SSC, its appended SSIC, and its corresponding instructions directly to MPU 107 via input port 105.

When the subscriber presses common service key 119, MPU 107 executes a set of instructions to display the contents of NSSCMA 114 on display unit 108. As above, the subscriber may search the contents of NNDMA 111 to locate a specific SSC by pressing UP key 125 and DOWN key 126. When the subscriber presses the common dial key 123, MPU 107 executes another set of instructions to send a specific SSC to telephone switching network in order to activate a particular special service. In the preferred embodiment, the specified SSC corresponds to the SSC shown on display unit 108 when the subscriber presses common dial key 123.

To terminate the particular special service selected, the subscriber presses common delete/cancel key 121 while the selected SSC is shown on display unit 108. In response, MPU 107 executes a set of instructions to send a "cancel" instruction to the telephone switching network, thereby deactivating the previously selected special service.

D. One-Touch Dialing of Special Service Codes

Each embedded SSIC further includes a sub-address code corresponding to a one-touch dialing key (e.g., one of keys 131–1311). When the subscriber presses one-touch dialing key 131, for example, MPU 107 executes a set of instructions to retrieve the SSC corresponding to one-touch dialing key 131 from NSSCMA 114, and to send the SSC to the telephone switching network. In the preferred embodiment, each sub-address codes corresponds to a number (e.g., 1–11 shown in FIG. 1) indicating to which of the one-touch dialing keys 131–1311 the SSC corresponds.

E. Mailbox Facilities

When the subscriber terminal receives data having a mailbox instruction code (MBIC) embedded in it, MPU 107 recognizes the MBIC and responds by executing a set of instructions to store the received mailbox data in MBMA 115. In the preferred embodiment, the MBIC corresponds to the telephone keypad symbol "#*", although other symbols could be suitably employed. MBMA is also subdivided into a number of memory sectors each corresponding to a specific mailbox address. When the received mailbox data also includes a mailbox address code, MPU 107 recognizes the mailbox address code and executes a set of instructions to store the received mailbox data in a corresponding sector of MBMA 115.

When the subscriber presses mailbox key 122, MPU 107 executes a set of instructions to display the contents of MBMA 115 on display unit 108. The subscriber may search the content of MBMA 115 by pressing UP key 125 or DOWN key 126.

F. Stored Data Maintenance

When the subscriber presses common directory key 116, common priority key 117, common reject key 118, common service key 119, or mailbox key 122, MPU 107 executes a set of instruction to display the contents of the relevant memory area (e.g., NNDMA 111, PCMA 112, RCMA 113, NSSCMA 114, or MBMA 115) on display unit 108. The subscriber may search the contents of the relevant memory area by pressing UP key 125 or DOWN key 126. When the subscriber presses the common delete/cancel key 121, MPU 107 executes a set of instructions to delete a specified entry from the relevant memory area. In the preferred embodiment, the specified entry corresponds to the entry shown on display unit 108 when common delete/cancel key 121 is pressed.

G. MPU Data Handling Process

Figures 5, 5B:
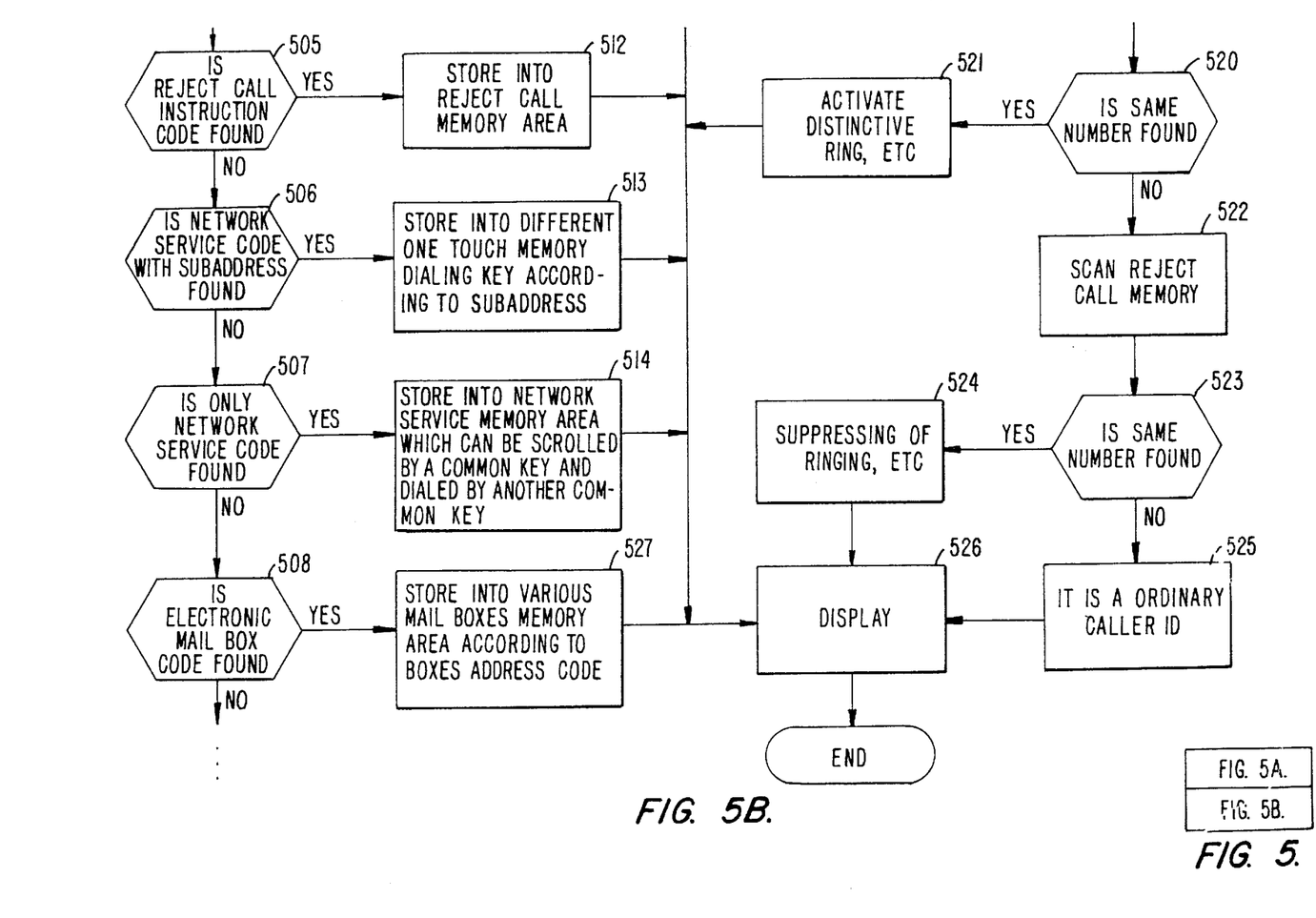
FIG. 5 is a flow chart of a MPU data handling process according to the present invention.
Figure 5A:
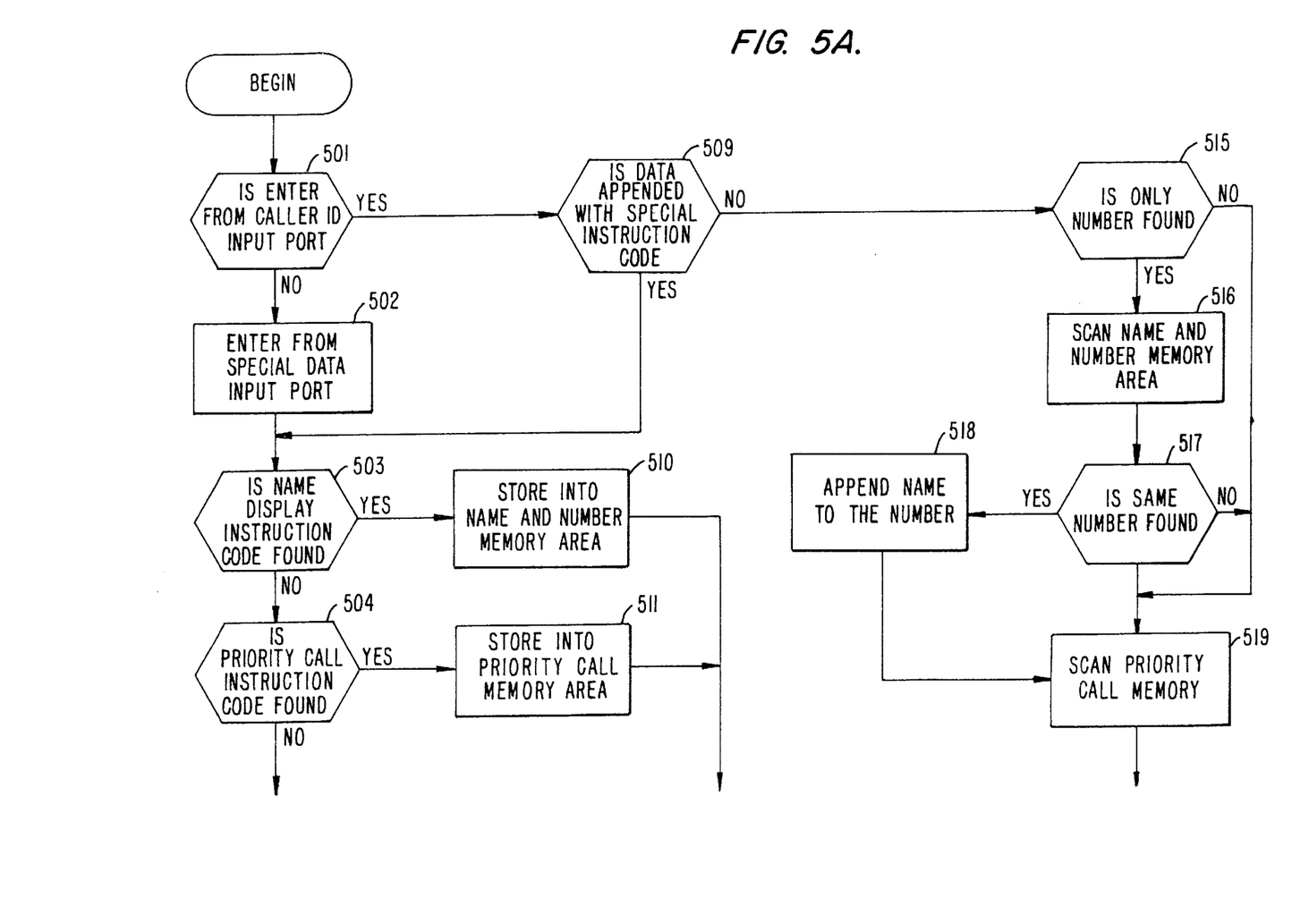

FIG. 5 is a flow chart which describes a preferred embodiment of an MPU data handling process for the present invention. When MPU 107 detects incoming data, MPU 107 determines at steps 501 and 502 whether the data was received at caller port 105 or input port 105. When the data is received at input port 105, MPU 107 determines at steps 503–508 whether the instruction code embedded in the received data corresponds to the NNCIC, the PCIC, the RCIC, the SSIC, or the MBIC, respectively, and stores the received data in the appropriate memory area of data-storage device 109, accordingly, in steps 510, 511, 512, 513, 514 and 527. More specifically, MPU 107 determines at step 503 whether the embedded instruction code corresponds to the NNCIC. If so, then MPU 107 stores the received data in NNDMA 111 at step 510. When the embedded instruction code does not correspond to the NNCIC, MPU 107 determines at step 504 whether the embedded instruction code corresponds to the PCIC. If so, then MPU 107 stores the received data in PCMA 112 at step 512. When the embedded instruction code does not correspond to the PCIC, MPU 107 determines at step 505 whether the embedded instruction code corresponds to the RCIC. If so, then MPU 107 stores the received data in RCMA 113 at step 512. When the embedded instruction code does not correspond to the RCIC, MPU 107 determines at step 506, whether the embedded instruction code corresponds to the SSIC and whether the received data includes a sub-address code corresponding to one of the one-touch dialing keys 131–131ll. If the embedded instruction code does correspond to a SSIC and the received data includes a sub-address code, then MPU 107 stores the received data in a subdivision of NSSCMA 114 which corresponds to the one-touch dialing key specified by the sub-address code at step 513. Otherwise, MPU 107 determines at step 507 whether the embedded instruction code corresponds to the SSIC. If so, MPU 107 stores the received data at the next available memory location in NSSCMA 114 at step 514. When the embedded instruction code does not corresponds to a SSIC, MPU determines at step 508 whether the embedded instruction code corresponds to the MBIC. If so, MPU stores the received data in MBMA 115 at step 527.

When MPU 107 determines at step 501 that the incoming data is received from caller port 104, MPU 107 next determines at step 509 whether the received data includes an embedded instruction code. If so, MPU 107 processes the data according to steps 503 through 508 as described above.

When the received data does not include an embedded instruction code, MPU 107 next determines at step 515 whether the received data only corresponds to the caller's phone number. If so, then MPU 107 scans the contents of NNDMA 111 at step 516 and determines at step 517 whether the caller's phone number matches any of the phone numbers stored therein. When there is a match, MPU 107 appends the name corresponding to the matching phone number at step 518. When there is not a match in NNDMA 111, or when the received data includes both a caller's phone number and name, MPU 107 scans the phone numbers stored in PCMA 112 at step 519 and determines at step 520 whether there is a match with the caller's phone number. When there is a match, MPU 107 executes a plurality of instructions to activate a distinctive ring at step 521 to indicate to the subscriber that a priority call has been received. When there is no match found in PCMA 112, MPU 107 scans the phone numbers stored in RCMA 113 at step 522 and determines at step 523 whether there is a match with the caller's phone number. When MPU 107 finds a match in RCMA 113, MPU 107 suppresses the ring at step 524. If no match is found, MPU 107 recognizes that the received data is an ordinary incoming call and produces an ordinary ringing signal.

Conclusion

In conclusion, it can be seen that the present invention provides a convenient apparatus and method automatically acquiring, converting, analyzing, storing, and retrieving data transmitted over telephone lines, and for performing automatic data processing and data transmission of the data. The apparatus may be integrated with a telephone or may be utilized as an add-on device for a conventional telephone.

While the above is a complete description of a preferred embodiment of the invention, various modifications, alternative constructions, and equivalents may be used. For example, instead of dividing the data storage unit into a plurality of pre-defined memory areas, the data stored in the data storage unit may be grouped according to the type instruction code embedded in the received data. Furthermore, when the caller's phone number corresponds to a "reject-call" phone number stored in RCMA 113, MPU 107 may execute a set of instructions to either activate a distinctive "reject-call" tone, or to otherwise indicate to the subscriber that an unwanted call has been received. Accordingly, the above description should not be taken as limiting the scope of the invention which is defined by the appended claims.

What is claimed is:

1. A telephone device comprising:
    an incoming-call interface, coupled to a telephone line, for receiving and decoding a plurality of input data signals included in an incoming-call signal from said telephone line;
    a classifier unit, responsive to said plurality of input data signals, for determining when said plurality of input data signals includes an instruction code and a plurality of information signals, and distinguishing among different instruction codes;
    a data storage unit having a plurality of memory areas, for storing a plurality of information signals received from said incoming-call interface;
    a controller, coupled to said classifier unit and said data storage unit, for processing said plurality of information signals according to said different instruction codes received from the telephone line, and for storing each one of said plurality of information signals into each one of said plurality of memory locations according to said different instruction codes.

2. The telephone device of claim 1, wherein said instruction code is received at the incoming-call interface together said information signals and identifies said plurality of information signals as being a particular one of a plurality of types of information signals.

3. The telephone device of claim 2, wherein said plurality of memory areas in said data storage unit are predefined, and wherein each of said predefined memory areas is adapted for storing an information signal belonging to a predefined type of said plurality of types of information signals.

4. The telephone device of claim 3, wherein said plurality of pre-defined memory areas includes:
    a name-and-number memory area for storing a plurality of information signals of a name-and-number type;

a priority-call memory area for storing a plurality of information signals of a priority-call type;

a reject-call memory area for storing a plurality of information signals of a reject-call type;

a special-services-codes memory area for storing a plurality of information signals of a special-service-code type; and a mailbox memory area for storing a plurality of information signals of a mailbox type.

5. The telephone device of claim 4 further comprising an outgoing-call interface, coupled to said controller and said telephone line, for generating an outgoing-call signal responsive to a plurality of output data signals provided by said controller.

6. The telephone device of claim 5 further comprising a display unit coupled to said controller; a user interface, coupled to said controller, including a plurality of control switches, each for generating one of a plurality of switch signals when activated; and a sound transducer coupled to said controller.

7. The telephone device of claim 6, wherein said controller comprises:

a main control unit, coupled to said classifier unit and said user interface, for generating a plurality of control signals responsive to said instruction code and said plurality of switch signals;

a storage processor, coupled to said data storage unit, for causing said plurality of information signals to be stored in said data storage unit responsive to a first subset of said plurality of control signals, and for retrieving said plurality of information signals from said data storage unit responsive to a second subset of said plurality of control signals;

a comparison processor, responsive to a third subset of said plurality of control signals, for comparing a plurality of information signals received from said line interface unit with said plurality of information signals stored in said data storage unit, and for indicating a match;

a line-out processor, coupled to said outgoing-call interface, for controlling an operation of said outgoing-call interface responsive to a fourth subset of said plurality of control signals;

a display processor, coupled to said display unit, for displaying said plurality of information signals retrieved from said data storage unit on said display unit responsive to a fifth subset of said plurality of control signals; and a sound processor, coupled to said sound transducer, for generating a normal-ring sound with said sound transducer responsive to a sixth subset of said plurality of control signals, and for generating a priority-ring sound with said sound transducer responsive to a seventh subset of said plurality of control signals.

8. The telephone device of claim 7, wherein said controller further comprises:

a caller port for receiving said plurality of input data signals from said incoming-call interface; and an input port for receiving a plurality of input data signals from an input device within line-of-sight of the said telephone device, wherein said input device can be a conventional keyboard, an infra-red keyboard, or an infra-red data transmitter.

9. The telephone device of claim 8, wherein said classifier unit, said main control unit, said storage processor, said comparison processor, said line-out processor, said display processor, and said sound processor are implemented by a circuit comprising a central processing unit (CPU) and a memory containing a program.

10. The telephone device of claim 9, wherein said telephone device is integrated with a conventional telephone.

11. In a telephone device having an incoming-call interface for generating input data responsive to an incoming call signal; a classifier for determining when the input data includes an instruction code and information signals; a controller for processing the information signals according to the instruction code; a data storage unit having a plurality of memory areas for storing a plurality of information signals received from said incoming-call interface; a display unit; a user interface; and a sound transducer, a method for automatically acquiring, processing, and storing telephone service information retrievable from conventional telephone lines or another specified input port, said method comprising the steps of:

(a) receiving a plurality of input data signal from said incoming-call interface;

(b) determining whether each one of said input data signals includes an instruction code with a plurality of information signals; and (c) processing said plurality of information signals according to said instruction code when said plurality of input signals includes said instruction code, and storing said plurality of information signals into one of said plurality memory areas of said data storage unit according to said instruction code.

12. The method of claims 11, wherein said step of processing said plurality of information signals comprises the steps of:

(a) determining a type of said instruction code, there being a plurality of pre-defined types of instruction codes;

(b) storing said plurality of information signals in a pre-defined memory area of said data storage unit, there being a plurality of pre-defined memory areas, wherein said pre-defined memory area stores information signals associated with said type of said instruction code.

13. The method of claim 11, wherein said step of processing said plurality of information signals comprises steps of:

(a) determining a type of said instruction code, there being a plurality of pre-defined types of instruction codes; and (b) storing said plurality of information signals in said data storage unit, such that said plurality of information signals are stored in a group according to said type of said instruction code.

14. The method of claim 12, wherein said step of storing said plurality of information signals in a pre-defined memory area comprises the steps of:

(a) determining whether said plurality of information signals includes a sub-address code; and (b) storing said remaining plurality of information signals in a sub-division of said pre-defined memory area, said sub-division being specified by said sub-address code.

15. The method of claim 14, wherein said step of determining a type of said instruction code comprises the steps of:

i) determining whether said instruction code corresponds to a name-and-number type;

ii) determining whether said instruction code corresponds to a priority-call type;

iii) determining whether said instruction code corresponds to a reject-call type;

iv) determining whether said instruction code corresponds to a special-service-code type; and v) determining whether said instruction code corresponds to a mailbox type.

16. The method of claim 15 further comprising the steps of:

(d) processing said plurality of input data signals as incoming-call data when no instruction code is included in said plurality of input data signals, said processing including the steps of:
1) determining whether said plurality of input data signals includes a caller phone number;
2) determining whether said plurality of input data signals includes a caller name;
3) scanning a name-and-number memory area of said data storage device to determine whether there is a matching directory phone number stored therein when said plurality of input data signals does not include a caller name;
4) appending a name corresponding to said matching directory phone number to said caller phone number when said matching directory phone number is found;
5) scanning a priority-call memory area of said data storage unit to determine whether there is a matching priority-call phone number stored therein;
6) indicating to the user that a priority-call has been received when a matching priority phone number is found;
7) scanning a reject-call memory area of said data storage unit to determine whether there is a matching reject-call phone number stored therein;
8) indicating to the user that a reject-call has been received when a matching reject-call phone number is found; and
9) generating a normal-ring tone at said sound transducer when no matching priority-call phone number is found and no matching reject-call phone number is found in said data storage unit.

17. The method of claim 16, further comprising the steps of:

(e) retrieving said plurality of information signal corresponding to said type of said instruction code from said data storage unit;

(f) displaying said plurality of information signals on said display unit; and (g) specifying a selected subset of said plurality of information signals; and (h) generating an outgoing-call signal corresponding to said selected subset of said plurality of information signals.

18. The method of claim 17, wherein said plurality of information signals includes a phone number.

19. The method of claim 17, wherein said plurality of information signals includes a special service code for activating a service provided by a telephone company.

20. A telephone or telephone add-on device comprising:

data receiving means for receiving data transmitted by a telephone company on a telephone line, and for receiving data transmitted by other programmable data transmitting apparatus on the telephone line;

control means responsive to data received by said data receiving means and being adapted to recognize any instruction code embedded in said data from the telephone line;

processing means for processing said data in accordance with said instruction code; and also store said plurality of information signals into different areas of said data storage unit according to said different instruction codes;

data storage means, wherein said data storage means is organized into a plurality of pre-defined memory areas and said data received by said data receiving means is stored in a specific memory area in accordance with the nature of said instruction code; and means for retrieving data from said data storage means;

wherein said retrieved data may be transmitted as an out-going call signal.

21. The telephone device of claim 8, wherein said controller further comprises:

an instruction code generator, coupled to said outgoing-call generator, for generating said instruction code and embedding said instruction code in said plurality of output data signals responsive to an eighth subset of said plurality of control signals.

22. A telephone device comprising:

an incoming-call interface, coupled to a telephone line, for receiving and decoding a plurality of input data signals, said input data signals having information signals and being included in an incoming-call signal from said telephone line;

a first classifier unit, responsive to said input data signals, for determining whether said input data signals includes an instruction code, there being a plurality of instruction codes;

a data storage unit, for storing said information signals and said instruction codes received from said incoming-call interface;

a second classifier unit, responsive to said information signals and instruction codes stored in said data storage unit, for determining if said information signals stored in said data storage unit include said instruction codes, there being a plurality of instruction codes; and a controller, coupled to said classifier units and to said data storage unit, for storing said information signals and instruction codes received from said first classifier unit into said data storage unit, and for processing said plurality of information signals from the second classifier unit according to said different instruction codes.

23. The telephone device of claim 22, wherein said instruction code identifies said plurality of information signals as being a particular one of a plurality of types of information signals.

24. The telephone device of claim 23, wherein said plurality of instruction codes includes:

a name-and-number instruction code for indicating the name and number information included in the information signals;

a priority-call instruction code for indicating the priority number information included in the information signals;

a reject-call instruction code for indicating the reject number information included in the information signals;

a special-service-code instruction code for indicating the service code information included in the information signals; and a mailbox instruction code for indicating the mail box information included in the information signals.

25. In a telephone device having an incoming-call interface for generating input data responsive to an incoming call signal; a first classifier for determining when the input data includes an instruction code and information signals; a data storage unit for storage of a plurality of information signals and instruction codes received from said incoming-call interface; a second classifier for determining when an information signal stored in the data storage unit includes a particular instruction code; a controller for processing the information signals according to the instruction code; a display unit; a user interface; and a sound transducer, a method for automatically acquiring, processing, and storing telephone service information received from conventional telephone lines, said method comprising the steps of:

receiving a plurality of input data signals from the incoming-call interface;

determining whether said plurality of input data signals includes an instruction code and a plurality of information signals;

storing said plurality of information signals and said included instruction codes together in said data storage unit;

retrieving said plurality of information signals and included instruction codes from said data storage unit;

determining if the information signals retrieved from the data storage unit include one of a plurality of instruction codes; and     processing said plurality of information signals retrieved from said data storage unit according to said different instruction codes determined.

26. The method of claim 25, wherein said step of determining if the information signals includes one of a plurality of instruction codes comprises the steps of:

determining whether said information signals include an instruction code that corresponds to a name-and-number type;

determining whether said information signals include an instruction code that corresponds to a priority-call type;

determining whether said information signals include an instruction code that corresponds to a reject-call type;

determining whether said information signals includes an instruction code that corresponds to a special-service-code type; and     determining whether said information signals includes an instruction code that corresponds to a mailbox type.

27. The method of claim 26 further comprising the steps of:

processing said plurality of input data signals as incoming-call data when no instruction code is included in said plurality of input data signals, said processing step further comprising the steps of:

determining whether said plurality of input data signals includes a caller phone number;

determining whether said plurality of input data signals includes a caller name;

scanning said data storage unit to determine whether there is a information signal including a name-and-number instruction code and determining if said information signal include a directory phone number matching the incoming-call data;

appending a name which is included in said matching information signal to the input data signal when said matching directory phone number is found;

scanning the data storage unit to determine whether there is an information signal which includes a priority-call type instruction code, and upon finding a priority-call type instruction code, determining if said information signal includes a phone number matching the incoming-call data;

indicating to the user that a priority-call has been received when said matching priority-call phone number is found;

scanning the data storage unit to determine whether there is an information signal including a reject-call type instruction code, and upon finding a reject-call type instruction code, determining if said information signal includes a phone number matching the incoming-call data;

indicating to the user that a reject-call has been received when said matching reject-call phone number is found; and     generating a normal-ring tone at said sound transducer when no matching priority-call phone number is found and no matching reject-call phone number is found in said data storage unit.

28. The method of claim 27, further comprising the steps of:

retrieving from said data storage unit a subset of said plurality of information signals, said subset of information signals having a particular type of instruction code;

displaying said subset of information signals on said display unit;

specifying select ones of said subset of information signals; and     generating an outgoing-call signal corresponding to said selected information signals.

* * * * *